June 4, 1963

A. BONDS 3,091,988

WIRE CUTTING MECHANISM

Filed March 22, 1957

INVENTOR.
Albert Bonds,
BY
Byron, Hume, Geown + Clement
Attys

Patented June 4, 1963

3,091,988
WIRE CUTTING MECHANISM
Albert Bonds, Cleveland, Ohio, assignor to Preformed Line Products Company, Cleveland, Ohio, a corporation of Ohio
Filed Mar. 22, 1957, Ser. No. 647,871
2 Claims. (Cl. 83—355)

This invention relates, as indicated, to a wire cutting mechanism, and more particularly to a rotary shear.

It is an object of the invention to provide a mechanism for cutting wires which has a short time cutting interval.

It is a further object of the invention to provide a wire cutting mechanism that operates with a minimum amount of interference to the continuous length of wire as it is fed to the cutting mechanism.

It is another object of the invention to provide a wire cutting mechanism that is inexpensively manufactured and which requires less maintenance than previous machines for this purpose.

With these and other objects in view, the invention consists of certain novel features of construction and operation as will be more fully described and particularly pointed out in the specification, drawings and claims appended hereto.

Figure 1:
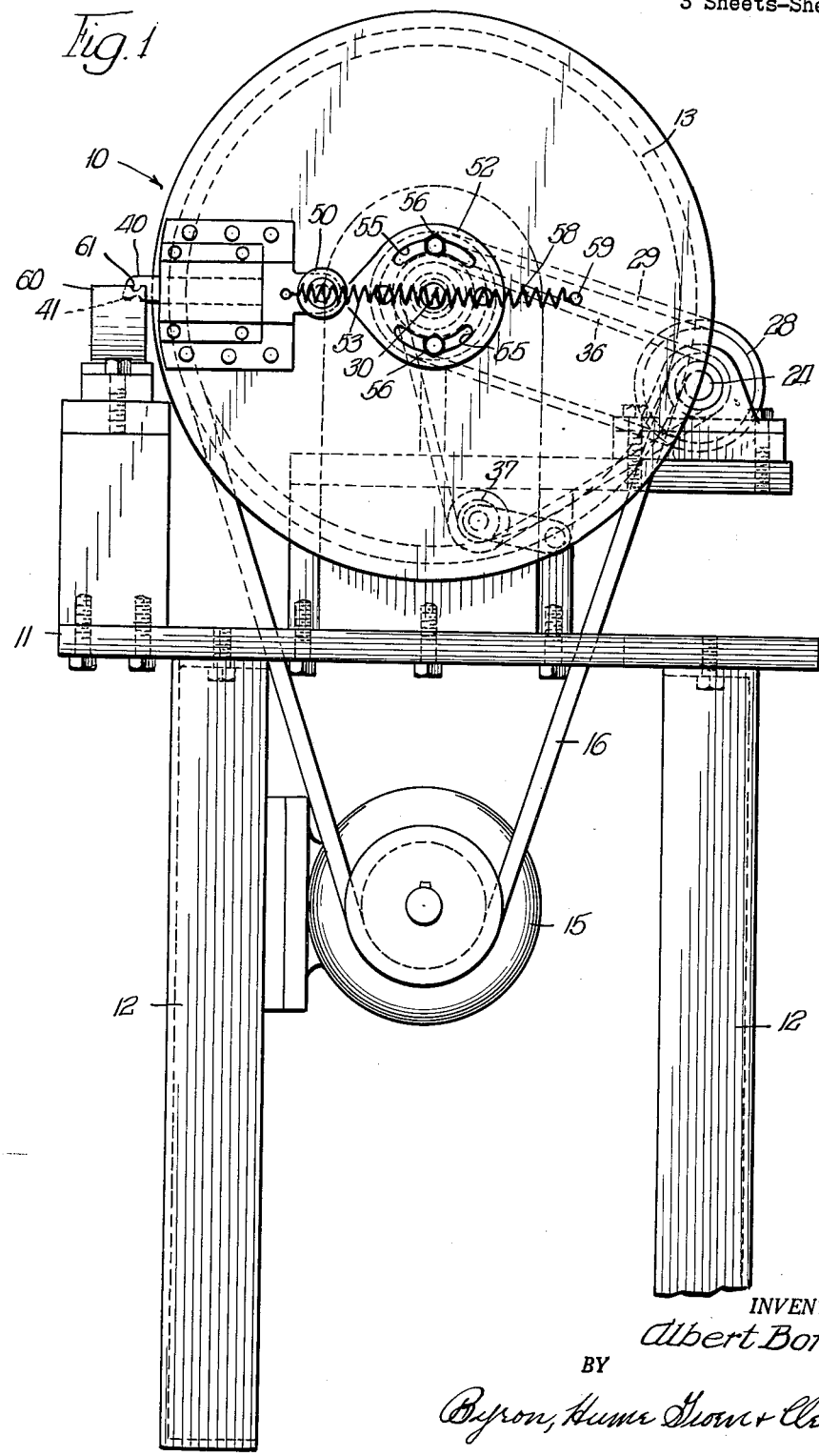
FIGURE 1 is a side view in elevation of a wire cutting mechanism embodying the invention.
Figure 2:
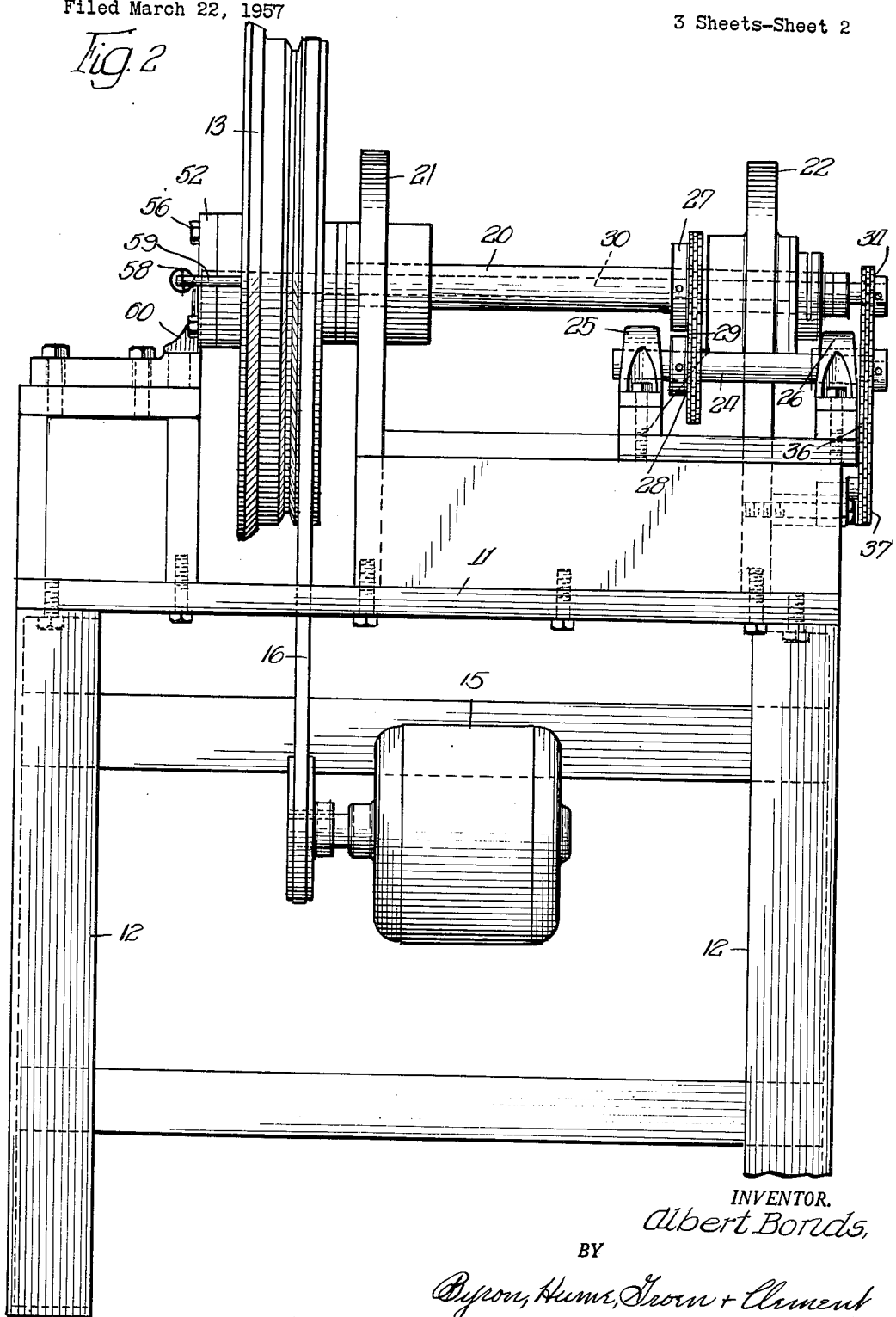
FIGURE 2 is a rear view in elevation of the mechanism shown in FIGURE 1.

Referring now to the drawings, there is shown a wire cutting mechanism 10 mounted on a platform 11 supported by four legs 12. The wire cutting mechanism has a flywheel 13 mounted for rotation about its axis. The flywheel is driven by an electric motor 15 through a belt 16.

Secured to the flywheel is a hollow spindle 20 journaled on two spaced upright supports 21, 22. A shaft 24 is journaled in two spaced supports 25, 26. Shaft 24 is driven by hollow spindle 20. Sheave 27, secured to hollow shaft 20, and sheave 28, secured to shaft 24, are connected by an endless belt 29, so as to drive shaft 24.

Journaled in the hollow spindle 20 is a shaft 30 having one end 31 projecting beyond the flywheel 13 and the other end 32 extending beyond the end of the hollow shaft 20 opposite the flywheel. Shaft 30 is driven by a sheave 34 mounted thereon. Sheave 34 is connected to sheave 35 which is mounted on shaft 24 through an endless belt 36. An idler pulley 37 may engage the belt 36. It will be seen that the relative angular velocity of the hollow spindle 20 and shaft 30 is determined by the diameters of sheaves 27, 28, 34, 35. By the selection of sheaves of suitable sizes shaft 30 is turned with, and at a slower angular velocity than, hollow spindle 20.

Figure 3:
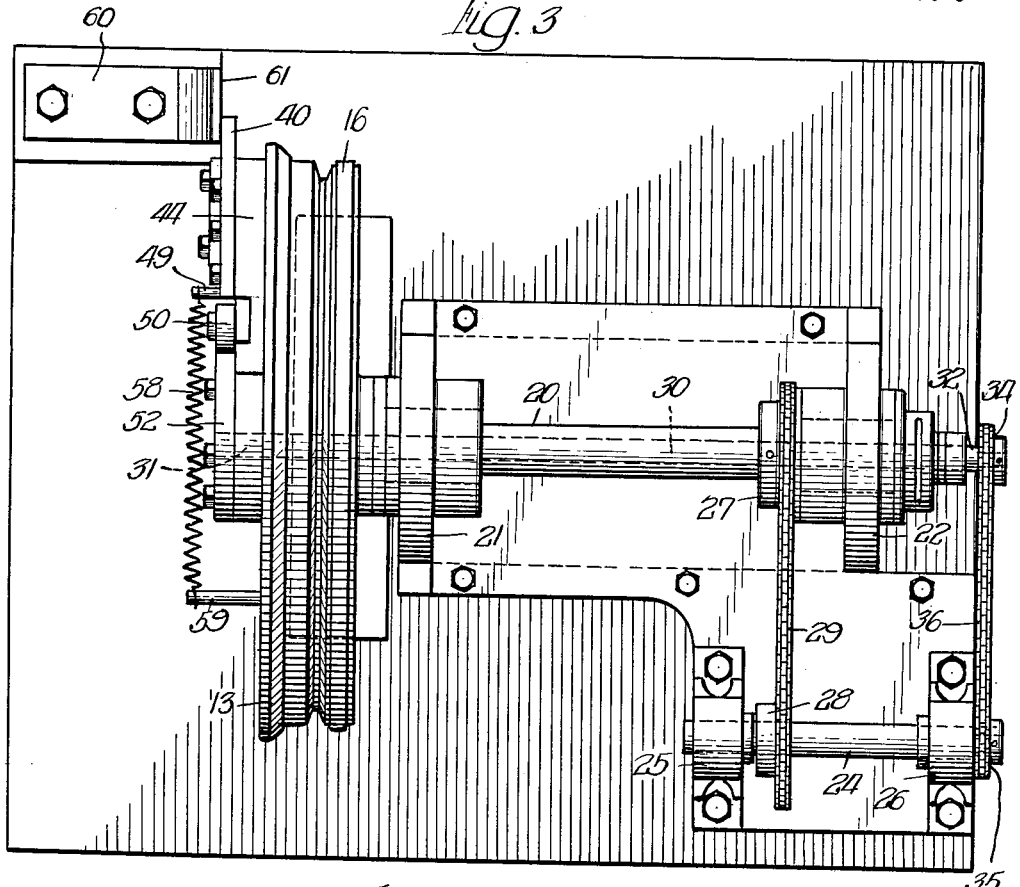
FIGURE 3 is a top plan view of the mechanism shown in FIGURE 1.
Figure 4:
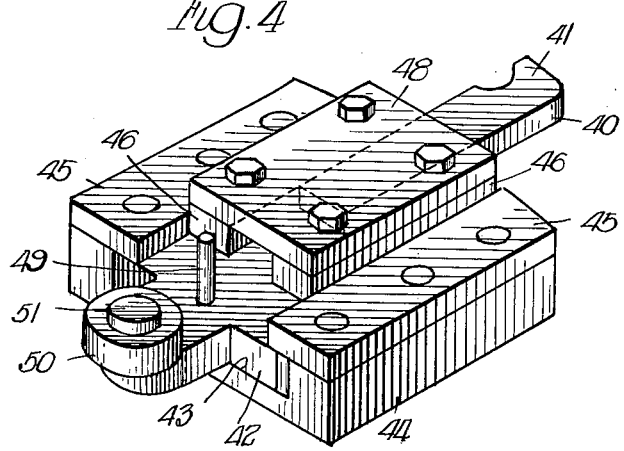
FIGURE 4 is an enlarged perspective view of the knife assembly.

Referring now to FIGURES 1, 3 and 4, there is shown a knife assembly having a knife 40 with a cutting end portion 41. The knife is slidably mounted, so that the cutting portion may be moved radially and projected, when desired, beyond the periphery of flywheel 13. A carriage 42 is supported in a groove 43 of a mounting block 44. Plates 45 are bolted to the mounting block 44 and extend over the edges of a groove 43 for holding and guiding the carriage. For guiding the carriage a pair of ribs 46 are mounted on the carriage in juxtaposition to the plates 45 and in sliding engagement therewith. A plate 48 is secured to the ribs 46 by suitable bolts. A post 49 extends outwardly from the carriage 42. The entire knife assembly is mounted on the flywheel with the mounting block secured adjacent the marginal portion thereof, so that the cutting portion 41 of the knife will project beyond the periphery of the flywheel when the knife is extended. It will be noted that the knife assembly of the type disclosed holds the knife firmly during the cutting operation, although it is readily movable radially. Also the flywheel imparts momentum to the knife for effective cutting operations through the rotational velocity imparted to its mass spaced from its axis.

Roller 50 supported by a pin 51 on the carriage 42 functions as a cam follower for engaging cam 52. Cam 52 is secured to shaft 30 and has a raised lobe 53 for about forty-five degrees of its circumference. When the lobe engages roller 50, carriage 42 is forced outwardly to extend the cutting portion of the knife outside the flywheel.

A spring 58 is secured between post 49 on the carriage 42 and a post 59 on flywheel 13. The spring holds the knife 41 in retracted position, except for the interval at which the cam projects it beyond the periphery of the flywheel.

Cam 52 has a pair of arcuate slots 55 through which pass bolts 56 for securing it to shaft 30. By loosening the bolts and rotating the cam on the slots, a vernier adjustment to shaft 30 may be made.

From the foregoing, the operation of the wire cutting mechanism is believed to be apparent. The flywheel is rotated by motor 15 through endless belt 16. The cutting portion 41 of the knife 40 is normally urged in retracted position by spring 58 within the outer edge of the flywheel. The flywheel is mounted on a hollow spindle 20 which in turn drives shaft 30 journaled therein through a belt and pulley arrangement. Shaft 30 rotates in the same direction, and at a slower angular velocity, than the spindle 20. Since the flywheel is mounted on hollow spindle 20 and the cam 52 is mounted on shaft 30, they will rotate in the same direction. The relative angular velocity of the flywheel and cam may be as follows:

| Revolutions Per Cutting Operation | | Cam: flywheel Velocity Ratio |
|---|---|---|
| Cam | Flywheel | |
| 1 | 2 | 0.50 |
| 2 | 3 | 0.66 |
| 3 | 4 | 0.75 |
| 4 | 5 | 0.80 |
| 6 | 7 | 0.85 |
| 7 | 8 | 0.87 |
| 9 | 10 | 0.90 |

When the time interval of six revolutions per cut is desired, the cam will lag one-sixth of a revolution for each revolution of flywheel and will therefore project cutter once in each six revolutions of flywheel and be displaced angularly, in sequence, 60°, 120°, 180°, 240° and 300° for the other five revolutions from starting point, which, of course, is at the cutting position. Projection and retraction of cutter are each normally limited to one revolution of the flywheel and this limits the cam angle, as subtended from the cam shaft center, to 720° divided by the number of revolutions per cut. Note cam 53 has a lobe of approximately 90° in the illustrated embodiment.

The wire (not shown) to be cut is fed as a continuous length along a guide 60 and across a shear edge 61. Edge 61 is adjacent the path of the knife 40 when it is projected. The wire is fed from a reel (not shown) along the guide 60 in a path that is essentially parallel to the rotational axis of the cutter and substantially normal to the planes in which the knife travels, until a predetermined amount overhangs edge 61. During this time the flywheel may rotate two or more revolutions. The knife is then projected by cam 52. At the instant of rotation when this occurs, the cutting portion 41 of the knife traverses the edge 61 of the guide to shear practically instantaneously a piece of wire from the continuous length into the size desired.

The practical advantages of the invention disclosed herein are numerous of which only a few are enumerated. The interval at which the knife is traversing the wire is very small, for example, about five degrees of the rotation of the flywheel. This short time cutting interval has other related advantages in preventing scuffing or marring of the cut lengths of the wire. It also gives minimum interference to the continuous feeding of the wire along the support 60. Another advantage is the reduction of noise by the machine. Still another advantage related to the foregoing is that a shorter guide support is necessary for feeding the wire to the cutting mechanism because of the reduced interference. Another advantage is that the momentum imparted by the mass of the flywheel spaced from its axis to the knife effectively and efficiently performs the cutting operation.

In the drawing and specification there has been set forth a preferred embodiment of the invention, and although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claims.

For example, a crank (or eccentric) and connecting rod may be substituted for the cam, roller and spring. Also, a sun gear might be located coaxially with the flywheel, geared directly to a planetary gear having means for projecting and retracting a movable cutter, which sun gear could be stationary or differentially driven as in the case of the cam 52. In such an arrangement, obviously the gear ratios of the sun and planetary gears could be varied to afford the desired interval of actuation of the cutter blade. The radially reciprocable cutter blade lends itself equally well to actuation by an electromagnet or solenoid carried upon or within the flywheel, either to retract the cutter blade to non-cutting position against the bias of a spring when energized, or positively to project the cutter against a similar bias in the reverse relationship of the parts. A timer, associated with the drive, and brush contacts upon slip rings in the flywheel would serve to make and break the circuit to the magnetic means as required.

What is claimed is:

1. A rotary cutter comprising a fly wheel adapted to be rotated about its axis, a hollow shaft drivingly connected to said fly wheel, motor means drivingly engaging said hollow shaft for rotating said fly wheel, a movable knife reciprocally mounted on said fly wheel, said knife having a cutting portion for projecting beyond the periphery of said fly wheel when said knife is extended, a relatively stationary cutting edge in a position with respect to said knife when extended to cut stock continuously advancing thereto, means for advancing stock to be cut along a path that is substantially parallel to the rotational axis of said fly wheel and cross-wise to the rotary path of movement of said knife, means normally urging said knife to a retracted non-cutting position, cam means coaxial with said fly wheel and in continuous engagement with said knife for selectively moving the cutting portion of said knife beyond the periphery of said fly wheel, a drive shaft member extending through said hollow shaft and having said cam means mounted thereon, means extending between said hollow shaft and said drive shaft for driving the latter, said means rotating said cam means in the same direction as said fly wheel at an angular velocity less than said fly wheel to move said knife in a projected position in a regular time sequence of at least more than one revolution of said fly wheel.

2. A rotary cutter comprising a fly wheel adapted to be rotated about its axis, a hollow shaft drivingly connected to said fly wheel, motor means drivingly engaging said hollow shaft for rotating said fly wheel, a movable knife reciprocally mounted on said fly wheel, said knife having a cutting portion for projecting beyond the periphery of said fly wheel when said knife is extended, a relatively stationary cutting edge in a position with respect to said knife when extended to cut stock continuously advancing thereto, means for advancing stock to be cut along a path that is substantially parallel to the rotational axis of said fly wheel and cross-wise to the rotary path of movement of said knife, means normally urging said knife to a retracted non-cutting position, cam means coaxial with said fly wheel and in continuous engagement with said knife for selectively moving the cutting portion of said knife beyond the periphery of said fly wheel, a drive shaft member extending through said hollow shaft and having said cam means mounted thereon, means extending between said hollow shaft and said drive shaft for driving the latter, said means rotating said cam means in the same direction as said fly wheel to periodically extend said knife.

References Cited in the file of this patent

UNITED STATES PATENTS

| | | |
|---|---|---|
| 854,179 | Sanderson | May 21, 1907 |
| 1,965,523 | MacFarren | July 3, 1934 |
| 1,969,433 | Smitmans | Aug. 7, 1934 |
| 2,272,702 | Haegele | Feb. 10, 1942 |
| 2,391,719 | Llewellyn | Dec. 25, 1945 |
| 2,405,204 | Goodrich | Aug. 6, 1946 |
| 2,445,174 | Hannewald et al. | July 13, 1948 |
| 2,550,146 | Gillich | Apr. 24, 1951 |